(12) United States Patent
Tsym (10) Patent No.: US 9,413,651 B2
(45) Date of Patent: Aug. 9, 2016

(54) SELECTIVE DEEP PACKET INSPECTION (71) Applicant: Broadcom Corporation, Irvine, CA (US)

(72) Inventor: Kirill Tsym, Modiin (IL)

(73) Assignee: Broadcom Corporation, Irvine, CA (US)

( * ) Notice: Subject to any disclaimer, the term of this patent is extended or adjusted under 35 U.S.C. 154(b) by 76 days.

(21) Appl. No.: 13/715,372

(22) Filed: Dec. 14, 2012

(65) Prior Publication Data

US 2014/0169367 A1  Jun. 19, 2014

(51) Int. Cl.
*H04L 12/28* (2006.01)
*H04L 12/741* (2013.01)
*H04L 29/06* (2006.01)

(52) U.S. Cl.
CPC ............ *H04L 45/74* (2013.01); *H04L 63/0245* (2013.01); *H04L 69/14* (2013.01); *H04L 69/22* (2013.01); *H04L 63/0236* (2013.01)

(58) Field of Classification Search
None
See application file for complete search history.

(56) References Cited

U.S. PATENT DOCUMENTS

| | | | |
|---|---|---|---|
| 7,643,753 B2 | 1/2010 | Weitz et al. | |
| 7,801,161 B2 | 9/2010 | Levy et al. | |
| 8,339,959 B1 * | 12/2012 | Moisand | H04L 63/0236 370/235 |
| 2002/0087732 A1 * | 7/2002 | Boucher et al. | 709/250 |
| 2003/0198189 A1 * | 10/2003 | Roberts et al. | 370/252 |
| 2004/0042456 A1 * | 3/2004 | Dittmann et al. | 370/392 |
| 2006/0114832 A1 * | 6/2006 | Hamilton | H04L 12/2602 370/244 |
| 2006/0233101 A1 | 10/2006 | Luft et al. | |
| 2007/0067497 A1 * | 3/2007 | Craft et al. | 709/250 |
| 2007/0070997 A1 | 3/2007 | Weitz et al. | |
| 2007/0121653 A1 | 5/2007 | Reckamp | |
| 2008/0002579 A1 * | 1/2008 | Lindholm et al. | 370/230 |
| 2009/0073884 A1 * | 3/2009 | Kodama et al. | 370/235 |
| 2009/0074411 A1 | 3/2009 | Bernard et al. | |
| 2009/0300153 A1 | 12/2009 | Ray et al. | |
| 2009/0323536 A1 | 12/2009 | Liu et al. | |
| 2010/0054231 A1 | 3/2010 | Dolganow et al. | |
| 2010/0132031 A1 | 5/2010 | Zheng | |
| 2010/0208590 A1 | 8/2010 | Dolganow et al. | |
| 2010/0235522 A1 * | 9/2010 | Chen et al. | 709/228 |
| 2011/0060851 A1 | 3/2011 | Monchero et al. | |

(Continued)

OTHER PUBLICATIONS

U.S. Appl. No. 13/361,169, filed Jan. 30, 2012, entitled "Method and System for Performing Distributed Deep-Packet Inspection".

(Continued)

*Primary Examiner* — Anh-Vu Ly
(74) *Attorney, Agent, or Firm* — Sterne, Kessler, Goldstein & Fox PLLC (57) ABSTRACT

Methods, systems, and computer program products for packet inspection are provided herein. The method includes the steps of receiving a first packet of a stream of packets and processing the first packet using a slow processing path. The method also includes the steps of examining a network layer or transport layer of the first packet to determine whether a protocol used by the stream of packets is relevant, and transferring subsequent packets in the stream to a fast processing path if the protocol used is not relevant. The method further includes the steps of examining an application layer of a pre-determined number of packets subsequent to the first packet to determine whether a Uniform Resource Locator (URL) field of each of the pre-determined number of packets is relevant, and transferring packets subsequent to the pre-determined number of packets to a fast processing path if the URLs are not relevant.

20 Claims, 6 Drawing Sheets

(56) References Cited

U.S. PATENT DOCUMENTS

| | | |
|---|---|---|
| 2011/0085571 A1* | 4/2011 | Chandrachood ........ H04L 49/50 370/431 |
| 2011/0145902 A1 | 6/2011 | Kim et al. |
| 2012/0069749 A1 | 3/2012 | Famolari et al. |
| 2012/0239846 A1 | 9/2012 | Baumer |
| 2013/0083806 A1 | 4/2013 | Fuentes et al. |
| 2013/0086279 A1* | 4/2013 | Archer et al. ................. 709/233 |
| 2013/0128885 A1* | 5/2013 | Kardashov et al. ........... 370/389 |
| 2013/0195457 A1 | 8/2013 | Levy et al. |
| 2013/0329584 A1* | 12/2013 | Ghose ................... H04L 45/586 370/252 |
| 2014/0052836 A1* | 2/2014 | Nguyen ................. H04L 45/38 709/223 |
| 2014/0059155 A1* | 2/2014 | Boucher et al. ............... 709/212 |

OTHER PUBLICATIONS

*Data-Over-Cable Service Interface Specifications, DOCSIS 3.0, MAC and Upper Layer Protocols Interface Specification*, CM-SP-MULPIv3.0-I16-110623, 768 pages, Copyright 2006-2011 Cable Television Laboratories, Inc.

* cited by examiner

SELECTIVE DEEP PACKET INSPECTION

BACKGROUND OF THE INVENTION

1. Field of the Invention

The embodiments presented herein generally relate to packet inspection.

2. Background Art

Communication systems, such as Cable television (CATV) systems or Broadband Gateways/Modems, provide internet access, and/or other services to consumers via signals transmitted to customer premises by optical fibers, coaxial cables, Wi-Fi, Bluetooth®, etc. A communication system includes two primary components: one or more remote nodes located proximate customer premises, and a supervisory communication node located at a headend. Communication systems may utilize, for example, Data Over Cable Service Interface Specification (DOCSIS) or Passive Optical Network (PON) compliant equipment and protocols to carry out a transfer of information, such as video, audio, and/or data between one or more remote nodes and a supervisory communication node.

Consider for example a Passive Optical Network (PON) system such as Gigabit PON (GPON) where a remote node is an Optical Network Unit (ONU) and the supervisory communication node is an Optical Line Terminal (OLT). PON generally refers to a group of specifications published by Full Service Access Network (FSAN) and the International Telecommunications Union (ITU) that define industry standards for the OLT and the ONUs. One such standard is the ITU-T G.984 Gigabit-capable Passive Optical Networks (GPON) standard which is incorporated herein by reference. In another example, consider a DOCSIS system where the remote node is a cable modem and the supervisory communication node is a cable modem termination system (CMTS). DOCSIS generally refers to a group of specifications published by CableLabs® that define industry standards for the CMTS and the cable modems (CMs). In part, DOCSIS sets forth requirements and objectives for various aspects of cable modem systems including, but not limited to, operations support systems, management, data interfaces, network layer, data link layer, and physical layer transport for data over cable systems. The DOCSIS interface specification entitled "Data-Over-Cable Service Interface Specifications, DOCSIS 3.0, MAC and Upper Layer Protocols Interface Specification, CM-SP-MULPIv3.0-I16-110623" is incorporated by reference herein in its entirety.

As used herein, the term "downstream" refers to the transfer of information in a direction from the supervisory communication node to the remote nodes. The term "upstream" refers to the transfer of information in a direction from the remote nodes to the supervisory communication node. Typical upstream packet processing by a remote node however is neither selective, nor efficient. Methods and systems are needed to overcome these deficiencies.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

The present invention will now be described with reference to the accompanying drawings. In the drawings, like reference numbers may indicate identical or functionally similar elements.

DETAILED DESCRIPTION OF THE INVENTION

While the present disclosure is described herein with reference to illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

Figure 1:
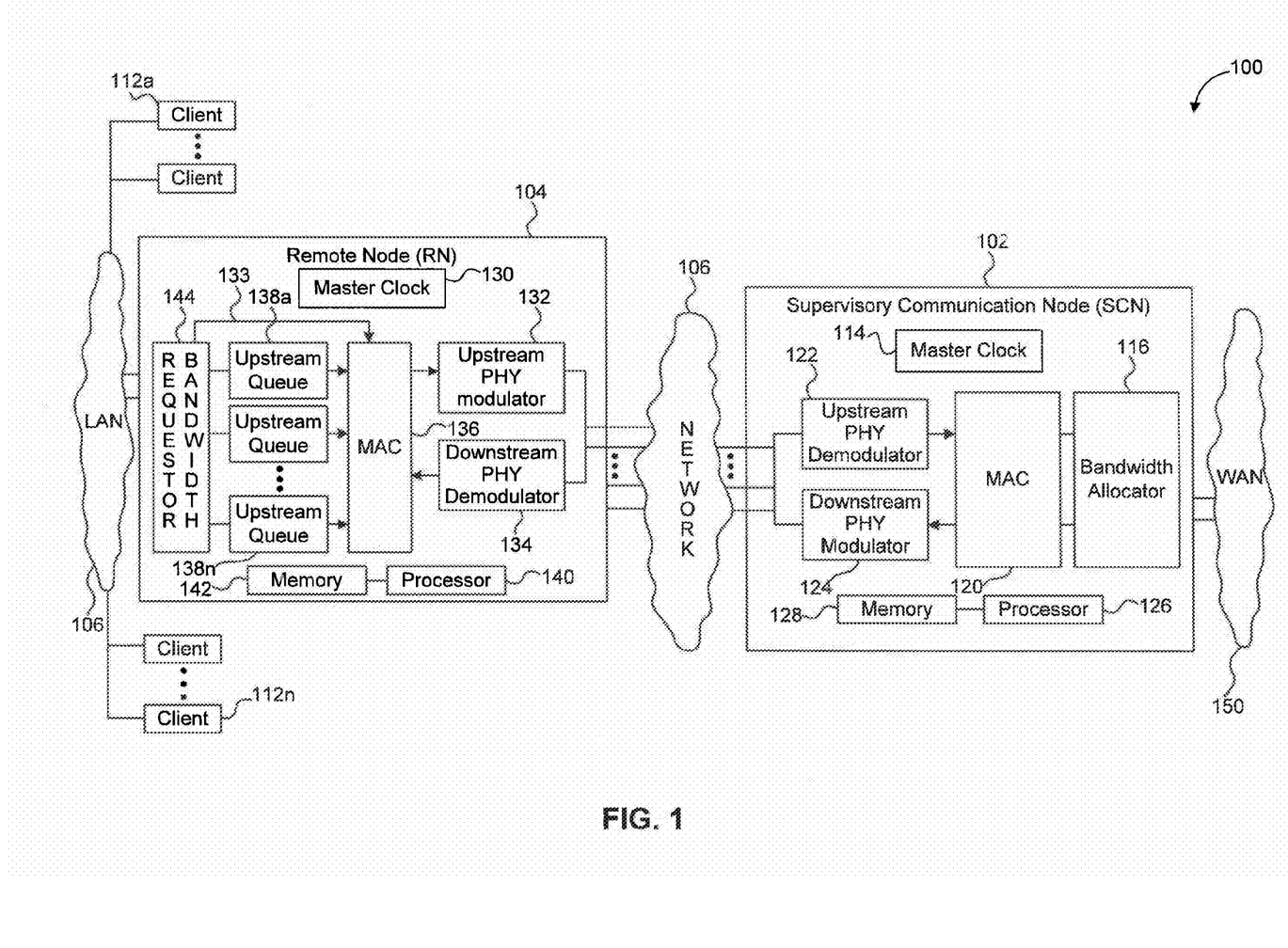
FIG. 1 illustrates an example communication system.

FIG. 1 illustrates an example communication system 100. System 100 includes a supervisory communication node (SCN) 102 coupled to at least one remote node (RN) 104 via a network 106. Each remote node 104 may be coupled to one or more client devices 112a-n (collectively referred to as client devices 112). In the examples presented herein, "n" is an arbitrary positive integer. Supervisory communication node 102 may be a cable modem termination system (CMTS) or an Optical Line Terminal (OLT). Remote node 104 may be a cable modem (CM) or an optical network unit (ONU). Network 106 may be, for example, an optical network or a Hybrid Fiber Co-axial (HFC) network.

RN 104 may include a master clock 130, an upstream physical layer modulator (US PHY) 132, and/or downstream physical layer demodulator (DS PHY) 134. The US PHY 132 and the DS PHY 134 are coupled to a Media Access Control (MAC) 136. MAC 136 is coupled to upstream queues 138a-n (collectively referred to as upstream queues 138). Upstream queues 138 store data for upstream transmission to CMTS 102. Bandwidth requestor 144 is coupled to upstream queues 138. RN 104 may also include a processor 140 coupled to a memory 142. According to an embodiment of the disclosure, the functions described herein as performed by RN 104 may be performed by processor 140 based on instructions stored in memory 142. RN 104 is coupled to network 106. Embodiments described herein may utilize any method of transmission including, but are not limited to, wired and/or wireless transmission media, including satellite, terrestrial (e.g., fiber optic, copper, twisted pair, coaxial, hybrid fiber-coaxial (HFC), or the like), radio, microwave, free-space optics, and/or any other form or method of transmission.

US PHY 132 forms the physical layer interface between RN 104 and the upstream channels of network 106. RN 104 may include a separate US PHY 132 for each one of the upstream channels. Video, voice, data and/or control messages that are destined for SCN 102 are collected at US PHY 132 and transmitted to SCN 102. US PHY 132 modulates and/or formats the information for upstream transmission to SCN 102

DS PHY 134 forms the physical layer interface between RN 104 and the downstream channel(s) of network 106. DS PHY 134 receives and demodulates all bursts from SCN 102.

The frequency spectrum available for use by the system 100 for communication may be partitioned into "channels." As used herein, the term "downstream channels" refers to the channels over which data is transferred from the SCN 102 to RN 104. The term "upstream channels" refers to the channels over which data is transferred from RN 104 to CMTS 102.

MAC 136 receives downstream signals from DS PHY 134 and provides upstream signals to US PHY 132, as appropriate. MAC 136 operates as the lower sublayer of the data link layer for RN 104. In embodiments, MAC 136 may support fragmentation, concatenation, payload header suppression/expansion, and/or error checking for signals transported over the physical layer.

Memory 142 may interact with MAC 136 to store the signals as they are processed by MAC 136. Memory 142 may also store various auxiliary data used to support the processing activities. Such auxiliary data includes security protocols, identifiers, rules, policies etc.

Bandwidth requestor 144 requests bandwidth from SCN 102 based on an amount of data in upstream queues 138, a Quality of Service (QoS) for upstream flows and a service level agreement (SLA) for a client 112. QoS may comprise requirements on aspects of a connection between a RN104 and SCN 102, such as service response time, loss, signal-to-noise ratio, cross-talk, echo, interrupts, frequency response, loudness levels etc. The SLA may specify the levels of availability, serviceability, performance, operation, or other attributes of a service provided by SCN 102 to RN 104, such as billing. In an example, bandwidth requestor 144 generates a signal 133 that indicates a queue depth of a queue 138 to MAC 136. The queue depth indicates an amount of data in an upstream queue 138 for transmission to SCN 102. MAC 136 prepares a request for bandwidth based on the queue depth.

SCN 102 includes a master clock 114, an upstream PHY demodulator 122, a downstream PHY modulator 124 and a MAC 120. MAC 120 is coupled to a bandwidth allocator 116. SCN 102 also includes a processor 126 coupled to a memory 128. According to an embodiment of the disclosure, the functions described herein as performed by SCN 102 may be performed by processor 126 based on instructions stored in memory 128.

SCN 102 is also coupled to RN 104 via network 106. US PHY 122 forms the physical layer interface between SCN 102 and the upstream channels of network 106. SCN 102 may include a separate US PHY 122 for each one of the upstream channels. US PHY 122 receives and demodulates all bursts from RN 104.

DS PHY 124 forms the physical layer interface between SCN 102 and the downstream channel(s) of network 106. Video, voice, data and/or control messages that are destined for RN 104 are collected at DS PHY 124 and transmitted to RN 104. DS PHY 124 modulates and/or formats the information for downstream transmission.

MAC 120 receives the upstream signals from US PHY 122 and provides the downstream signals to DS PHY 124, as appropriate. MAC 120 operates as the lower sublayer of the data link layer of SCN 102. In embodiments, MAC 120 supports fragmentation, concatenation, payload header suppression/expansion, and/or error checking for signals transported over the physical layer.

Memory 128 may interact with MAC 120 to store the signals as they are processed by MAC 120. Memory 128 may also store various auxiliary data used to support the processing activities. Such auxiliary data includes security protocols, identifiers, rules, policies etc.

Bandwidth allocator 116 may allocate bandwidth to a RN 104 based on the bandwidth request generated by bandwidth requestor 144 of RN 104.

In an example, a client 112 may be any wired or wireless device including but not limited to a personal computer, a laptop, personal digital assistants (PDAs), smart phones such as iPhones™, tablet devices such as an iPad™, media players such as an iPods™, storage devices such as Universal Serial Bus (USB) drives, hard disk drives, flash memory drives, optical drives such as CD ROMs and DVD ROMs, WiFi devices such as wireless phones or Voice over Internet Protocol (VoIP) phones and devices that may utilize LAN ports such as video game systems. RN 104 is coupled to one or more client devices 112a-n via Local Area Network (LAN) 101. Some client devices 112 may be coupled directly to remote node 104. Client devices 112 may communicate amongst each other via LAN 101 and send and receive data to or from Wide Area Network (WAN) 150. WAN 150 may be, for example, the Internet.

Figure 2:
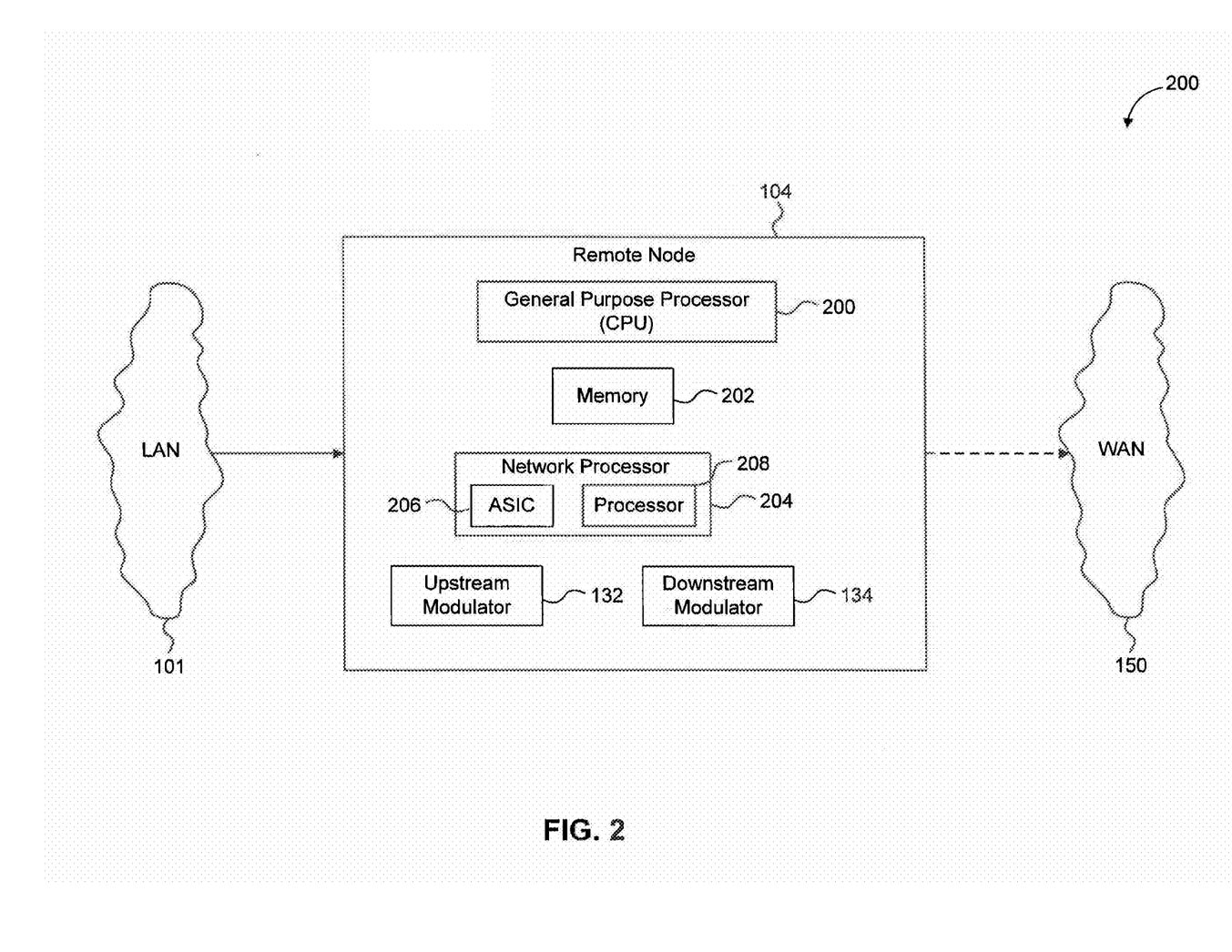
FIG. 2 illustrates an example remote node according to an embodiment.

FIG. 2 illustrates an example remote node 104 according to an embodiment. Remote node 104 includes a general purpose processor (GPP) 200, a memory 202, and a network processor 204 in addition to the components shown in FIG. 1. In an example, processor 140 and memory 142 shown in FIG. 1 may be the same as general purpose processor 200 and memory 200 respectively.

In an example, GPP 200 is an instruction set architecture (ISA) processor that can be programmed using instructions to selectively inspect packets. In contrast, network processor 204 includes an Application Specific Integrated Circuit (ASIC) 206 along with a processor 208. ASIC 206 does not execute instructions and may be only hardwired logic. The processor 208 executes microcode that may be a set of instructions for fast processing of network packets. Processor 208 may be a microprocessor or a microcontroller. The ASIC 206 is a parser that analyses incoming packets and parses the packets for relevant data that may be sent to the processor 208 for further processing. The processor 208 can process the parsed data and transport received packets between communication ports at a much higher speed than GPP 200 because of the specialized microcode for packet processing that it executes. The path for receiving packets from LAN 101, processing the packets, and transmitting them to the WAN is much faster when performed by network processor 204 since it has a dedicated ASIC along with a processor 208 that executes microcode specifically for processing packets. General purpose processor 200 is typically slower at processing packets because it may have to perform other functions such as channel management, driver management etc. for remote node 104 rather than just execute instructions to selectively process or examine packets for certain features. Furthermore, it is too slow for GPP 200 to use the parsed data provided by ASIC 206. In another example, GPP 200 may not even have access to the parsed data provided by ASIC 206. Network processor 204 is typically much faster than GPP 200 because it is specialized for packet processing and can utilize the fast parsing functions of the ASIC along with the microcode executed by processor 208 for specialized packet processing. While general purpose processor 200 is slower than network processor 204 for processing packets, it can be customized using instructions to selectively process packets. In contrast, network processor 204 while faster at processing packets compared to GPP 200 cannot selectively analyze contents of a packet since it only executes specialized microcode. General purpose processor 200 may be interchangeably referred to as a "slow processing path" herein. Network processor 204 may be interchangeably referred to as a "fast processing path" herein.

In a first example of a conventional packet processing system, a GPP 200 may transfer all upstream packets destined for WAN 150 to a network processor 204 for faster processing. However, such systems, while providing faster packet processing, do not allow for selective packet inspection by GPP 200. In a second example of a conventional packet processing system, GPP 200 may process all upstream packets destined for WAN 150. In the second example, the system allows for selectively packet processing, but it is much slower than the first system because it processes all packets using GPP 200. The embodiments presented herein provide methods, systems, and computer program products to selectively process packets that use a relevant protocol, have a relevant destination, and/or have relevant data content using a slow processing path. Packets that do not have a relevant protocol, destination, or data are transferred to a fast processing path. This provides the flexibility to selectively process certain packets using GPP 200 while maintaining fast processing speeds by processing non-relevant packets using network processor 204. Deep packet inspection is also described in U.S. patent application Ser. No. 13/361,169, filed on Jan. 30, 2012, which is incorporated by reference herein in its entirety.

Figure 4:
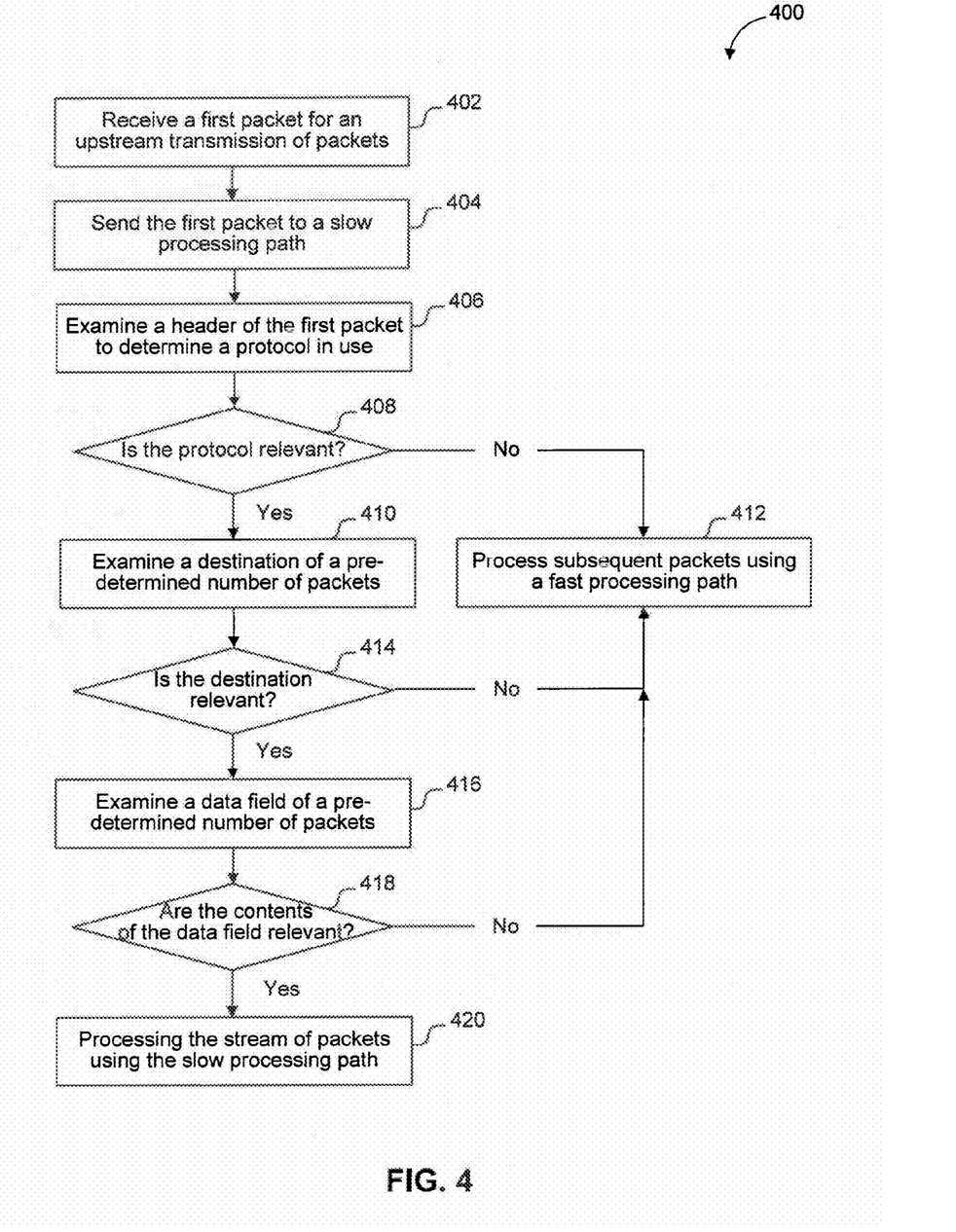
FIG. 4 illustrates an example flowchart for selective packet inspection, according to second embodiment of the disclosure.
Figure 5:
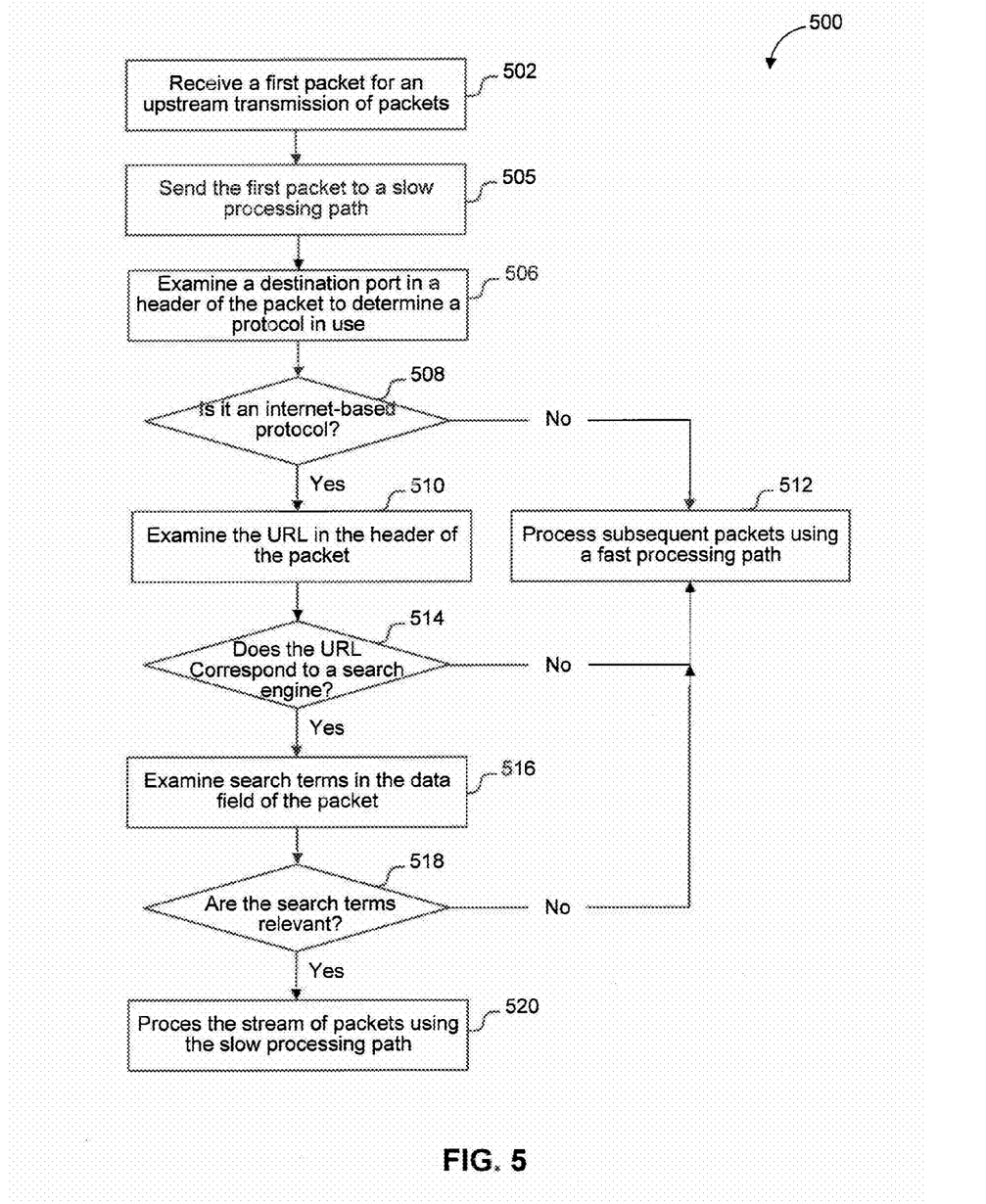
FIG. 5 illustrates an example flowchart for selective packet inspection, according to a third embodiment of the disclosure.

In an example, general purpose processor 200 can determine whether packets in a stream of packets are destined for the Internet. If the packets are destined for the Internet, general purpose processor can determine whether they are destined for a search engine such as Google™ or Bing™. General purpose processor 200 can selectively data mine packets destined for a search engine by examining the search terms in the data fields of such packets. If packets in a stream are not destined for a search engine, then the packets for that stream are forwarded to network processor 204 for fast processing. Various methods such as described in, for example, the flowcharts in FIGS. 3-5, are used to decide which packets will be selectively processed by general purpose processor 200 ("slow processing path") and which packets will be processed by network processor 204 ("fast processing path").

Figure 3:
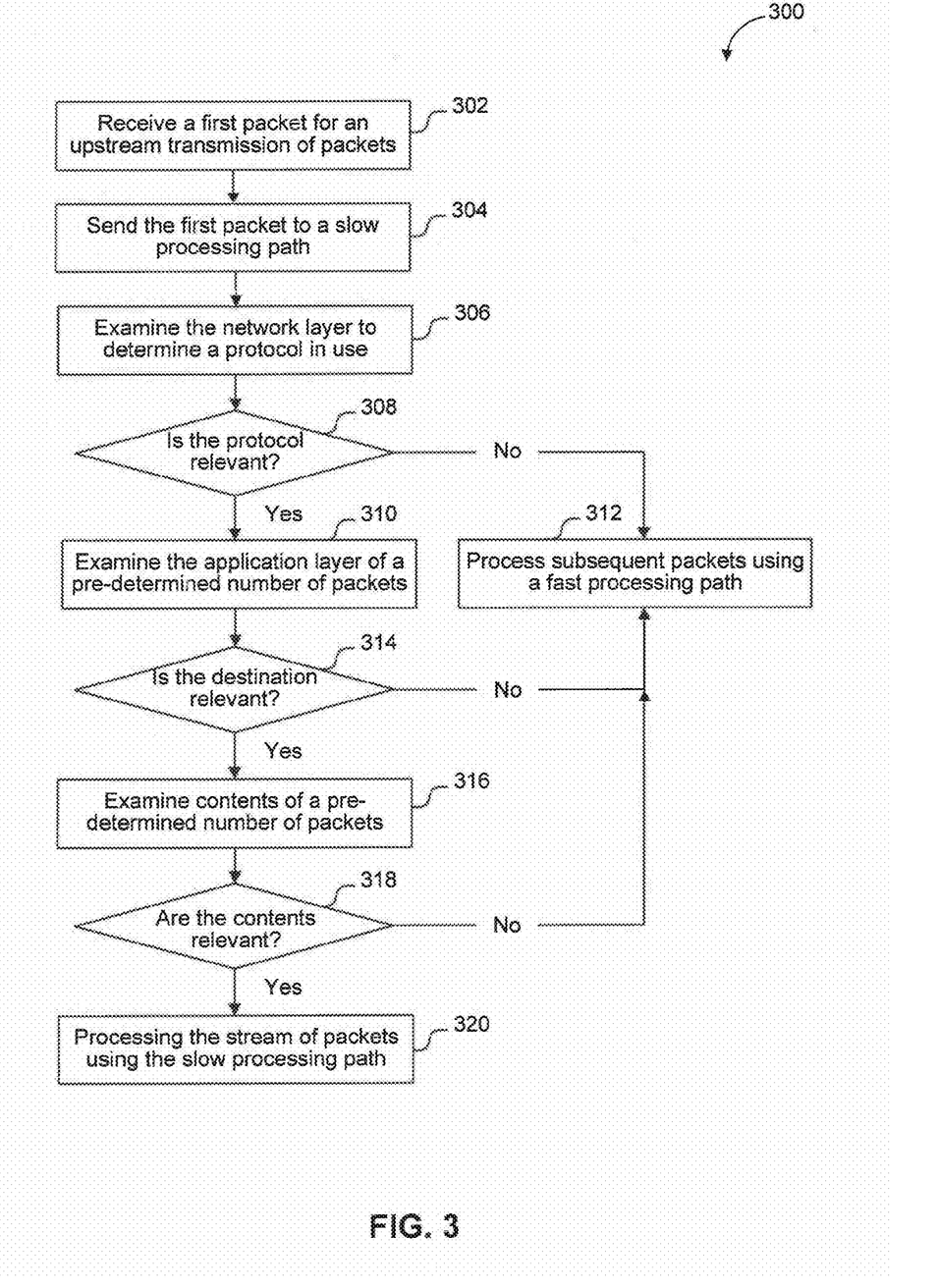
FIG. 3 illustrates an example flowchart for selective packet inspection, according to a first embodiment of the disclosure.

FIG. 3 illustrates an example flowchart 300 for selective packet inspection, according to an embodiment of the disclosure. Flowchart 300 will be described with reference to the example operating environment depicted in FIGS. 1-2. However, the process is not limited to these embodiments. Note that some steps shown in process 300 do not necessarily have to occur in the order shown. In an example, the steps are performed by remote node 104.

In step 302, a first packet from a stream of upstream packets is received. For example, remote node 104 receives a first packet of a stream of upstream packets via local area network 101. The stream of packets may correspond to a session started by a client device 112 to transmit data upstream to WAN 150 via SCN 102.

In step 304, the first packet is sent to a slow processing path for processing. For example, the first packet is sent to general purpose processor 200 for processing.

In steps 306, the network and/or transport layer of the first packet is examined to determine the protocol in use. For example, in an Open Systems Interconnection (OSI) network topology, general purpose processor 200 examines the network layer (also known as layer 3 in the OSI model) and/or the transport layer (also known as layer 4 in the OSI model) of the first packet to determine the protocol in use.

In step 308, it is determined whether the protocol is relevant. For example, general purpose processor 200 determines whether the protocol in use by the first packet is relevant to warrant further processing of subsequent packets in the stream by general purpose processor 200. If the protocol is not relevant, then the process proceeds to step 312. If the protocol is relevant, then the process proceeds to step 310.

In step 312, all subsequent packets in the stream are processed by the fast processing path. For example, all subsequent packets are processed by network processor 204.

In step 310, the application layers of a pre-determined number of packets subsequent to the first packet are examined by the slow processing path to determine a destination of the stream of packets. For example, the general purpose processor 200 examines the application layer for a pre-determined number of packets subsequent to the first packet to determine a destination of the stream of packets. In an example, if the protocol in use is Hypertext Transfer Protocol (HTTP), typically the fourth packet includes a Uniform Resource Locator (URL) that indicates the packet's destination. Therefore, in this example, the number of pre-determined packets is four. It is to be appreciated that the pre-determined number of packets is based on a protocol in use and may vary.

In step 314, it is determined if the destination of the stream of packets is relevant. If the destination is not relevant, then the process proceeds to step 312. If the destination is relevant, then contents of the pre-determined number of packets are further examined in step 316. For example, general purpose processor 200 examines the contents of the pre-determined number of packets in step 316.

In step 318, it is determined whether contents of the pre-determined number of packets are relevant for further processing using the slow processing path. If the contents of the packet are relevant, then the process proceeds to step 320. If the contents are not relevant, then the process proceeds to step 312 where all subsequent packets are processed by network processor 204.

In step 320, all packets subsequent to the pre-determined number of packets are also processed using the slow processing path.

FIG. 4 illustrates an example flowchart 400 for selective packet inspection, according to an embodiment of the disclosure. Flowchart 400 will be described with continued reference to the example operating environment depicted in FIGS. 1-2. However, the process is not limited to these embodiments. Note that some steps shown in flowchart 400 do not necessarily have to occur in the order shown. In an example, the steps are performed by remote node 104.

In step 402, a first packet of a stream of packets is received. For example, remote node 104 receives a first packet of a stream of packets via local area network 101. The stream of packets may correspond to a session started by a client 112 to transmit data upstream via SCN 102.

In step 404, the first packet is sent to a slow processing path for processing. For example, the first packet is sent to a general purpose processor 200 for processing.

In step 406, a header of the packet is examined to determine a protocol used by the packet. For example, general purpose processor 200 examines a header of the packet to determine a protocol in use.

In step 408, it is determined whether the protocol in use by the packet is relevant. If the protocol is not relevant then the process proceeds to step 412. If the protocol is relevant then the process proceeds to step 410.

In step 412, all subsequent packets in the stream are processed by the fast processing path. For example, all subsequent packets are processed by network processor 204.

In step 410, headers of a pre-determined number of packets subsequent to the first packet are examined by the slow processing path to determine their destination. For example, Uniform Resource Locators (URLs) in headers of a pre-determined number of packets are examined to determine their destination.

In step 414, it is determined whether the destination of the stream of packets is relevant. For example, general purpose processor 200 determines whether a destination indicated by the URL of the subsequent packets is relevant. In an example, if the protocol in use is Hypertext Transfer Protocol (HTTP), typically the fourth packet includes a Uniform Resource Locator (URL) that indicates the packet's destination. Therefore, in this example, the number of pre-determined packets is four. It is to be appreciated that the pre-determined number of packets is based on a protocol in use and may vary. If the destination is not relevant, then the process proceeds to step 412. If the destination is relevant, then the process proceeds to step 416.

In step 416, a data field of the packet is examined. For example, the general purpose processor 200 examines the data field of the pre-determined number of packets.

In step 418, it is determined if the contents of the data field are relevant. If the contents of the data field are relevant, then the process proceeds to step 420. If the contents of the data field are not relevant, then the process proceeds to step 412 where all subsequent packets in the stream are processed by the fast processing path.

In step 420, all subsequent packets in the stream are processed using the slow processing path. For example, in step 420, all subsequent packets in the stream are processed using general purpose processor 200.

FIG. 5 illustrates an example flowchart 500 for selective packet inspection, according to an embodiment of the disclosure. Flowchart 500 will be described with reference to the example operating environment depicted in FIGS. 1-2. However, the process is not limited to these embodiments. Note that some steps shown in process 500 do not necessarily have to occur in the order shown. In an example, the steps are performed by remote node 104.

In step 502, a first packet of a stream of packets is received. For example, remote node 104 receives a first packet of a stream of packets via local area network 101. The stream of packets may correspond to a session started by a client device 112 to transmit data upstream to WAN 150.

In step 504, the first packet is sent to a slow processing path for processing. For example, the first packet is sent to a general purpose processor 200 for processing.

In step 506, a destination port in a header of the first packet is examined to determine a protocol in use. For example, the general purpose processor 200 examines a destination port in a header of the first packet to determine a protocol in use.

In step 508, it is determined whether the protocol in use is an internet-based protocol. For example, if the destination port is 80, then the protocol in use is HTTP which is an internet-based protocol. It is to be appreciated that other internet-based protocols may be checked for as well including, but not limited to, Extensible Messaging and Presence Protocol (XMPP), and instant messaging protocols such as Internet Relay Chat (IRC) and Google Talk™. It is to be appreciated that the type of internet-based protocol may be arbitrary. If the protocol is not an internet-based protocol, then the process proceeds to step 512. If the protocol is an internet-based protocol, then the process proceeds to step 510.

In step 512, all subsequent packets in the stream are processed by the fast processing path. For example, all subsequent packets are processed by network processor 204.

In step 510, the uniform resource locators (URL) in the headers of a pre-determined number of packets are examined. For example, general purpose processor 200 examines the URLs in the headers of the pre-determined number of packets.

In step 514, it is determined whether the URLs in the headers of the pre-determined number of subsequent packets correspond to the address of a search engine. For example, general purpose processor 200 determines whether the URLs correspond to a search engine, such as Google™ or Bing™. If the URLs correspond to a search engine then the process proceeds to step 516. If the URLs do not correspond to a search engine, then the process proceeds to step 512.

In step 516, search terms in a data field of the pre-determined number of packets are examined. For example, the general purpose processor 200 examines search terms in data fields of the pre-determined number of packets.

In step 518, it is determined whether the search terms in the data fields of the pre-determined number of packets are relevant. For example, general purpose processor 200 determines whether search terms in the pre-determined number of packets are relevant. If the search terms are relevant, then the process proceeds to step 520. If the search terms are not relevant, then the process proceeds to step 512.

In step 520, all subsequent packets in the stream are processed using the slow processing path. For example, in step 420, all subsequent packets in the stream are processed using general purpose processor 200.

Example General Purpose Computer System

Embodiments presented herein, or portions thereof, can be implemented in hardware, firmware, software, and/or combinations thereof.

The embodiments presented herein apply to any communication system between two or more devices or within sub-components of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 6:
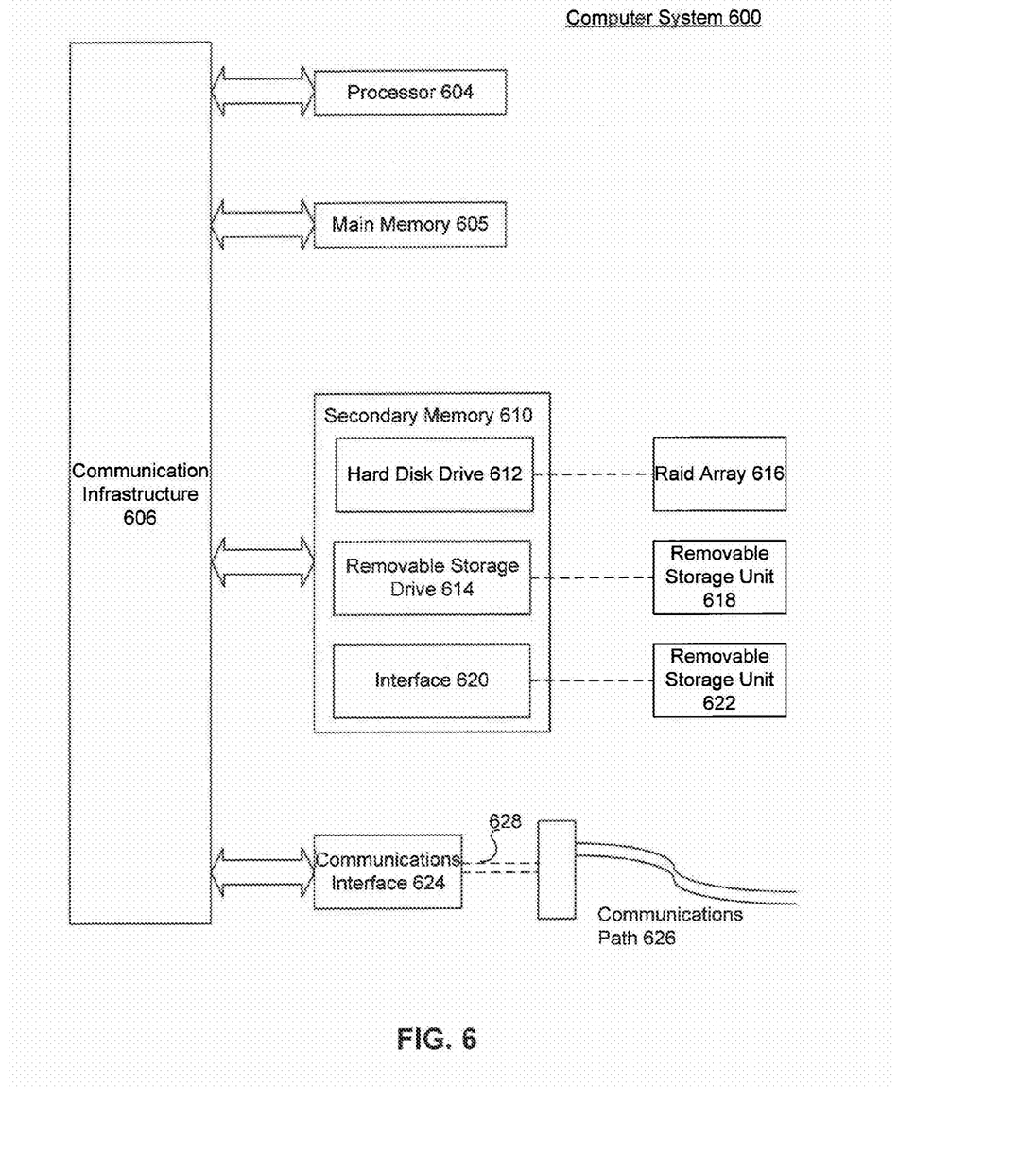
FIG. 6 is a block diagram of an exemplary computer system on which embodiments presented herein can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 600 is shown in FIG. 6. The computer system 600 includes one or more processors, such as processor 604. Processor 604 can be a special purpose or a general purpose digital signal processor. The processor 604 is connected to a communication infrastructure 606 (for example, a bus or network). Various software implementations are described in terms of this exemplary computer system. After reading this description, it will become apparent to a person skilled in the relevant art how to implement the disclosure using other computer systems and/or computer architectures.

Computer system 600 also includes a main memory 605, preferably random access memory (RAM), and may also include a secondary memory 610. The secondary memory 610 may include, for example, a hard disk drive 612, and/or a RAID array 616, and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618 represents a floppy disk, magnetic tape, optical disk, etc. As will be appreciated, the removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCMCIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path 626. Communications path 626 carries signals 628 and may be implemented using wire or cable, fiber optics, a phone line, a cellular phone link, an RF link and other communications channels.

The terms "computer program medium" and "computer usable medium" are used herein to generally refer to media such as removable storage drive 614, a hard disk installed in hard disk drive 612, and signals 628. These computer program products are means for providing software to computer system 600.

Computer programs (also called computer control logic) are stored in main memory 605 and/or secondary memory 610. Computer programs may also be received via communications interface 624. Such computer programs, when executed, enable the computer system 600 to implement the present disclosure as discussed herein. In particular, the computer programs, when executed, enable the processor 604 to implement the processes of the present disclosure. For example, when executed, the computer programs enable processor 604 to implement part of or all of the steps described above with reference to the flowcharts herein. Where the disclosure is implemented using software, the software may be stored in a computer program product and loaded into computer system 600 using raid array 616, removable storage drive 614, hard drive 612 or communications interface 624.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A method for selective packet inspection, comprising:
receiving a first packet of a stream of packets;
processing the first packet using a first processing path;
examining the first packet to determine whether a protocol used by the stream of packets is relevant to deep packet inspect and to data mine the first packet for relevant data;
transferring subsequent packets in the stream of packets to a second processing path if the protocol used by the stream of packets is not relevant, the second processing path processing a subsequent packet of the subsequent packets in less time than the first processing path;
examining headers of a pre-determined number of packets, subsequent to the first packet, of the stream of packets to determine whether a destination of the pre-determined number of packets is relevant; and
transferring packets in the stream of packets subsequent to the pre-determined number of packets to the second processing path if the destination of the pre-determined number of packets is not relevant.

2. The method of claim 1, further comprising:
examining data content of the pre-determined number of packets; and
transferring the packets in the stream of packets subsequent to the pre-determined number of packets to the second processing path if the data content is not relevant.

3. The method of claim 1, wherein examining the first packet comprises:
examining a destination port in a header of the first packet to determine whether the protocol used by the stream of packets is relevant.

4. The method of claim 1, wherein examining the headers of the pre-determined number of packets comprises:
examining Uniform Resource Locator (URL) fields of the pre-determined number of packets to determine the destination.

5. The method of claim 4, wherein examining the URL fields comprises:
determining whether the destination is a search engine.

6. The method of claim 2, wherein examining the data content of the pre-determined number of packets comprises:
determining whether specific keywords are present in search terms in data fields of the pre-determined number of packets.

7. The method of claim 1, further comprising:
selectively inspecting packets of the stream of packets using a first processor in the first processing path;
selectively parsing the packets of the stream of packets using a second processor in the second processing path to generate parsed data; and
executing microcode using a third processor in the second processing path to selectively process packets of the stream of packets using the parsed data.

8. A system for packet inspection, comprising:
a first processing path including a general purpose processor (GPP);
a second processing path including a network processor; and
memory, coupled to the GPP and the network processor, storing instructions, which when executed by the GPP, cause the GPP to:
process a first packet of a stream of packets using the first processing path;
examine the first packet to determine whether a protocol used by the stream of packets is relevant to deep packet inspect and to data mine the first packet for relevant data;
transfer subsequent packets in the stream of packets to the second processing path if the protocol used by the stream of packets is not relevant, the second processing path being configured to process a subsequent packet of the subsequent packets in less time than the first processing path;
examine headers of a pre-determined number of packets, subsequent to the first packet, of the stream of packets to determine whether a destination of the pre-determined number of packets is relevant; and
transfer packets subsequent to the pre-determined number of packets in the stream of packets to the second processing path if the destination of the pre-determined number of packets is not relevant.

9. The system of claim 8, wherein the instructions, which when executed by the GPP, further cause the GPP to:
examine data content of the pre-determined number of packets; and
transfer the packets subsequent to the pre-determined number of packets in the stream of packets to the second processing path if the data content is not relevant.

10. The system of claim 8, wherein the instructions, which when executed by the GPP when examining the first packet, cause the GPP to:
examine a destination port in a header of the first packet to determine whether the protocol used by the stream of packets is relevant.

11. The system of claim 8, wherein the instructions, which when executed by the GPP when examining the headers of the pre-determined number of packets, cause the GPP to:
examine Uniform Resource Locator (URL) fields of the pre-determined number of packets to determine the destination.

12. The system of claim 11, wherein the instructions, which when executed by the GPP when examining the URL fields of the pre-determined number of packets, cause the GPP to:
determine whether the destination is a search engine.

13. The system of claim 9, wherein the instructions, which when executed by the GPP when examining the data content of the pre-determined number of packets, cause the GPP to:
determine whether specific keywords are present in search terms in data fields of the pre-determined number of packets.

14. The system of claim 8, wherein the GPP is configured to selectively inspect packets of the stream of packets,
wherein the network processor is configured to parse packets of the stream of packets and generate parsed data; and
wherein the second processing path further comprises:
a processor configured to execute microcode to process packets of the stream of packets using the parsed data.

15. A non-transitory computer readable medium including computer executable instructions stored thereon that, if executed by a computing device, cause the computing device to perform operations, the operations comprising:
processing a first packet of a stream of packets using a first processing path;
examining the first packet to determine whether a protocol used by the stream of packets is relevant to deep packet inspect and to data mine the first packet of the stream of packets for relevant data;
transferring subsequent packets of packets in the stream to a second processing path if the protocol used by the stream of packets is not relevant, the second processing path being configured to process a subsequent packet of the subsequent packets in less time than if the subsequent packet were to be processed by the first processing path;
examining headers of a pre-determined number of packets, subsequent to the first packet, of the stream of packets to determine whether a destination of the pre-determined number of packets is relevant; and
transferring packets subsequent to the pre-determined number of packets in the stream of packets to the second processing path if the destination of the pre-determined number of packets is not relevant.

16. The non-transitory computer readable medium of claim 15, wherein the operations further comprise:
examining data content of the pre-determined number of packets; and
transferring the packets subsequent to the pre-determined number of packets in the stream of packets to the second processing path if the data content is not relevant.

17. The non-transitory computer readable medium of claim 15, wherein examining the first packet comprises:
examining a destination port in a header of the first packet to determine whether the protocol used by the stream of packets is relevant.

18. The method of claim 1, wherein the first processing path includes a general purpose processor.

19. The method of claim 1, wherein the second processing path includes a network processor.

20. The non-transitory computer readable medium of claim 15, wherein the first processing path includes a general purpose processor and the second processing path includes a network processor.

* * * * *